(12) United States Patent
Aldana et al.

(10) Patent No.: US 9,032,130 B2
(45) Date of Patent: May 12, 2015

(54) DOCK FOR DATA TRANSFER TO AND FROM PORTABLE ELECTRONIC DEVICE

(75) Inventors: Leonardo Aldana, Waterloo (CA); Jacob Warren Kimbrell, Raleigh, NC (US); Mark Peter Lamm, Mississauga (CA)

(73) Assignee: BlackBerry Limited, Waterloo, Ontario (CA)

( * ) Notice: Subject to any disclaimer, the term of this patent is extended or adjusted under 35 U.S.C. 154(b) by 275 days.

(21) Appl. No.: 13/612,241

(22) Filed: Sep. 12, 2012

(65) Prior Publication Data
US 2014/0072312 A1    Mar. 13, 2014

(51) Int. Cl.
| G06F 13/00 | (2006.01) |
| --- | --- |
| H04B 10/25 | (2013.01) |
| G06F 1/16 | (2006.01) |
| H04B 10/80 | (2013.01) |
| H04M 1/04 | (2006.01) |

(52) U.S. Cl.
CPC .......... *H04B 10/2503* (2013.01); *G06F 1/1632* (2013.01); *H04B 10/801* (2013.01); *H04M 1/04* (2013.01)

(58) Field of Classification Search
USPC .................................. 710/300–306, 310–315
See application file for complete search history.

(56) References Cited

U.S. PATENT DOCUMENTS

| 5,295,212 | A | 3/1994 | Morton et al. |
| --- | --- | --- | --- |
| 6,913,400 | B2 | 7/2005 | O'Toole et al. |
| 7,035,094 | B2 * | 4/2006 | Huang et al. ............. 361/679.55 |
| 7,069,059 | B2 * | 6/2006 | Osawa .......................... 455/572 |
| 7,480,138 | B2 * | 1/2009 | Kogan et al. ............. 361/679.02 |
| 7,532,461 | B2 * | 5/2009 | Krancher et al. ........ 361/679.41 |
| 7,541,907 | B2 * | 6/2009 | Wang et al. .................... 335/305 |
| 7,775,801 | B2 | 8/2010 | Shiff et al. |
| 7,778,018 | B2 * | 8/2010 | Motoe et al. ............. 361/679.21 |
| 7,778,023 | B1 * | 8/2010 | Mohoney ................. 361/679.41 |
| 7,890,688 | B2 * | 2/2011 | Lichtenegger ................ 710/303 |
| 7,916,467 | B2 | 3/2011 | Hotelling et al. |
| 8,536,827 | B2 * | 9/2013 | Gourley ....................... 320/107 |
| 2004/0174671 | A1 | 9/2004 | Huang et al. |
| 2005/0047082 | A1 | 3/2005 | Osawa |

(Continued)

FOREIGN PATENT DOCUMENTS

EP     2060962     5/2009

OTHER PUBLICATIONS

European Patent Office, European Search Report, issued in connection with European Application Serial No. 12184139.9, issued Feb. 15, 2013, 5 pages.

*Primary Examiner* — Raymond Phan
(74) *Attorney, Agent, or Firm* — Fish & Richardson P.C.

(57) ABSTRACT

A dock for receiving a portable electronic device. The dock includes a housing comprising an aperture in a recess for receiving and supporting the portable electronic device, and a communication assembly disposed in the housing and moveable relative to the housing. The communication assembly includes a dock optical transceiver disposed in the aperture for aligning with a device optical transceiver when the portable electronic device is disposed in the recess, and magnets coupled to the optical transceiver for aligning with complementary magnets of the portable electronic device to facilitate engagement and disengagement of the portable electronic device with the dock and to facilitate alignment of the dock optical transceiver with the device optical transceiver when the portable electronic device is engaged with the dock.

15 Claims, 7 Drawing Sheets

(56) References Cited

U.S. PATENT DOCUMENTS

| | | |
|---|---|---|
| 2005/0162824 A1* | 7/2005 | Thompson .................... 361/686 |
| 2006/0093273 A1 | 5/2006 | Fenwick et al. |
| 2007/0103266 A1 | 5/2007 | Wang et al. |
| 2007/0168593 A1* | 7/2007 | Montag et al. ................ 710/303 |
| 2007/0218775 A1 | 9/2007 | Coronado |
| 2007/0259536 A1 | 11/2007 | Long et al. |
| 2009/0168312 A1 | 7/2009 | Motoe et al. |
| 2010/0027941 A1 | 2/2010 | Stewart et al. |
| 2010/0146181 A1* | 6/2010 | Lichtenegger ................ 710/303 |
| 2011/0038582 A1 | 2/2011 | DiFonzo et al. |
| 2012/0039562 A1 | 2/2012 | Tan et al. |
| 2013/0151111 A1* | 6/2013 | Skelton .......................... 701/99 |

\* cited by examiner

US 9,032,130 B2

DOCK FOR DATA TRANSFER TO AND FROM PORTABLE ELECTRONIC DEVICE

FIELD OF TECHNOLOGY

The present disclosure relates to docks or stands for data transfer to and from portable electronic devices.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart phones, wireless personal digital assistants (PDAs), tablet computers, and laptop computers with wireless 802.11 or Bluetooth capabilities.

Docks, such as docking stations or stands are commonly utilized to provide a convenient receptacle for an electronic device while providing an interface for data transfer between the portable electronic devices and, for example, a computer. Such docks may also couple to a power source for charging a battery of the portable electronic device. Docks and portable electronic devices are susceptible to damage due to connection attempts when the portable electronic device and the dock are not properly aligned.

BRIEF DESCRIPTION OF THE DRAWINGS

Embodiments of the present disclosure will now be described, by way of example only, with reference to the attached figures.

DETAILED DESCRIPTION

Figure 1:
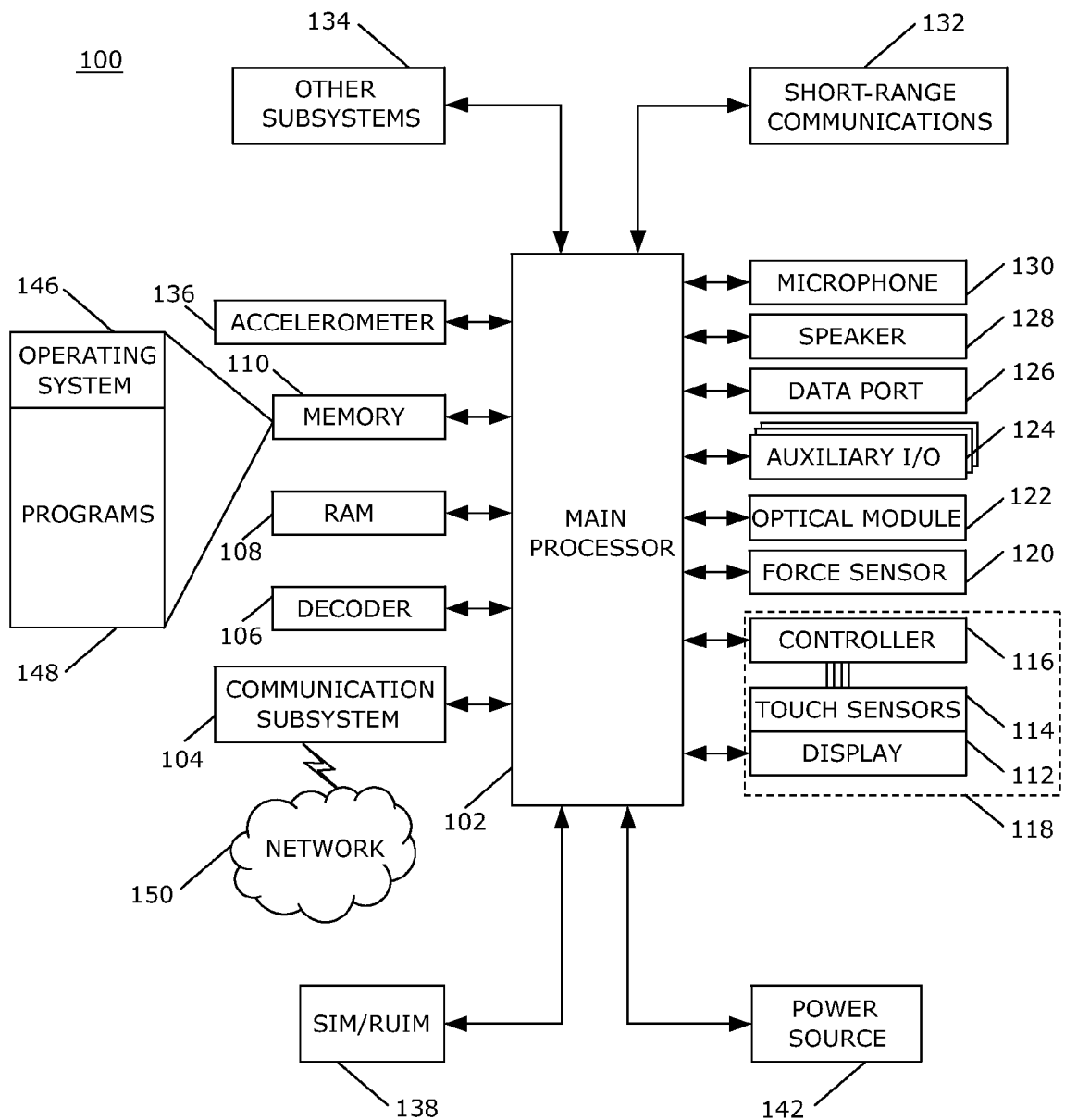
FIG. 1 is a block diagram of an example of a portable electronic device in accordance with the disclosure.

Some portable electronic devices, such as smart telephones and tablet computers, may be utilized to be handheld for ease of use and portability. That is, handheld devices are sized and shaped to be held or carried in a human hand and may be used while held. Many of these portable electronic devices, such as smart telephones and tablet computers, may be utilized with a variety of programs or applications and may store data associated with those programs or applications. A dock that facilitates the transfer of data to and from the portable electronic device is desirable to improve ease of data transfer.

The following describes a dock for receiving a portable electronic device. That is, the following describes a dock configured to or suitable for or is adapted to or otherwise capable of performing the function of receiving a portable electronic device. The dock includes a housing comprising an aperture in a recess for receiving and supporting the portable electronic device, and a communication assembly disposed in the housing and moveable relative to the housing. The communication assembly includes a dock optical transceiver disposed in the aperture for aligning with a device optical transceiver when the portable electronic device is disposed in the recess, and magnets coupled to the optical transceiver for aligning with complementary magnets of the portable electronic device to facilitate engagement and disengagement of the portable electronic device with the dock and to facilitate alignment of the dock optical transceiver with the device optical transceiver when the portable electronic device is engaged with the dock.

The term coupled is utilized herein to refer phyiscal or mechanical coupling, such as abutting, attaching, or joining, electrical couple, such as by an electrical conductor an inductive field, or communicative coupling, such as communication by sending and/or receiving signals, depending on the context. In some instances, the term coupled may be utilized to refer to coupling of more than one type.

The alignment between the optical transceivers on a portable electronic device and the dock is important because the light beam and sensors are small. Products manufactured in mass volumes typically include dimensional variances even in the tightest and most controlled manufacturing environment. Hence the docks are manufactured with extra clearances to receive portable electronic devices that may be of larger or smaller sizes due to dimensional variation. Docks are also subject dimensional variances, leading to docks with even larger clearances. These clearances create gaps that affect the way that the handheld sits on the dock, resulting in not only linear misalignments but also angular misalignments, even when the communications occur through the edge of the handheld. Optical connectivity and the absence of physical connectors that engage to each other and that require a relatively high force to disconnect, create challenges in maintaining communication even during vibration, such as the vibration that occurs when in a car, or in other environments where a vibration or impact may cause the portable electronic device or the dock to slightly move. Reducing the misalignment between the optical modules on the portable electronic device and the dock and inhibiting misalignment in dynamic environments expected during normal use of these devices is desirable.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein. Words such as "substantial" or "generally," as used herein, are intended to be descriptive but to avoid strict application or strict mathematical definition. To illustrate, two surfaces that are "substantially parallel" may be strictly parallel or approximately parallel. The term "generally perpendicularly" includes but is not limited to precisely perpendicularly. The absence of any words that expressly avoid strict application or definition (in the detailed description and in the claims), however, does not necessarily mean that strictness is intended. The dock described herein may be utilized with a variety of portable electronic devices including various components. In some embodiments, for example, the dock may include electrical components or moving parts, and may perform functions in addition to those described herein. In other embodiments, however, the dock may do little other than the functions described.

Examples of electronic devices include mobile, or handheld, wireless communication devices such as pagers, cellular phones, cellular smart-phones, wireless organizers, personal digital assistants, wirelessly enabled notebook computers, tablet computers, mobile internet devices, electronic navigation devices, and so forth. The electronic device may be a portable electronic device without wireless communication capabilities, such as a handheld electronic game, digital photograph album, digital camera, media player, e-book reader, and so forth.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications.

A power source 142, such as one or more rechargeable batteries, powers the portable electronic device 100. The portable electronic device may also include charging circuitry (not shown), such as an inductive coil and a power controller, that may enable the power source to be recharged wirelessly or through a physical electrical connection or both. Some embodiments of a dock may be used to deliver power to or recharge a battery in the portable electronic device 100.

The processor 102 interacts with other components, such as a Random Access Memory (RAM) 108, memory 110, a touch-sensitive display 118, one or more force sensors 120, an optical module 122 that includes one or more optical transceiver(s), an auxiliary input/output (I/O) subsystem 124, a data port 126, a speaker 128, a microphone 130, short-range communications 132 and other device subsystems 134. Optionally, the optical module 122 may be coupled to the auxiliary I/O subsystem 124. In addition or alternatively, the optical module 122 may be coupled to the communication subsystem 104. The touch-sensitive display 118 includes a display 112 and touch sensors 114 that are coupled to at least one controller 116 that is utilized to interact with the processor 102. Input via a graphical user interface is typically provided via the touch-sensitive display 118. Information, such as text, characters, symbols, images, icons, and other items that may be displayed or rendered on a portable electronic device, is displayed on the touch-sensitive display 118 via the processor 102. The processor 102 may also interact with an orientation sensor, such as an accelerometer 136 that may be utilized to detect direction of gravitational forces or gravity-induced reaction forces.

To identify a subscriber for network access, the portable electronic device 100 may utilize a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs, applications, or components 148 that are executed by the processor 102 and are typically stored in a persistent, updatable store such as the memory 110. Additional applications or programs may be loaded onto the portable electronic device 100 through the wireless network 150, the optical module 122, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be a capacitive touch-sensitive display that includes one or more capacitive touch sensors 114. The capacitive touch sensors may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected.

Figure 2A:
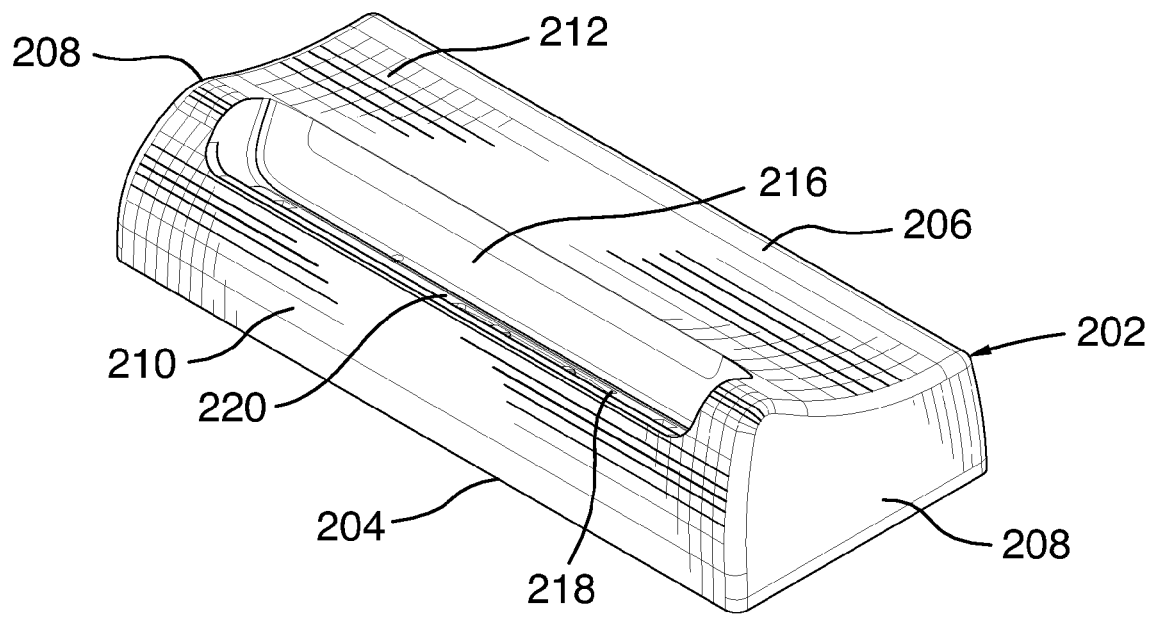
FIG. 2A and FIG. 2B are perspective views of a dock for use with the portable electronic device.
Figure 2B:
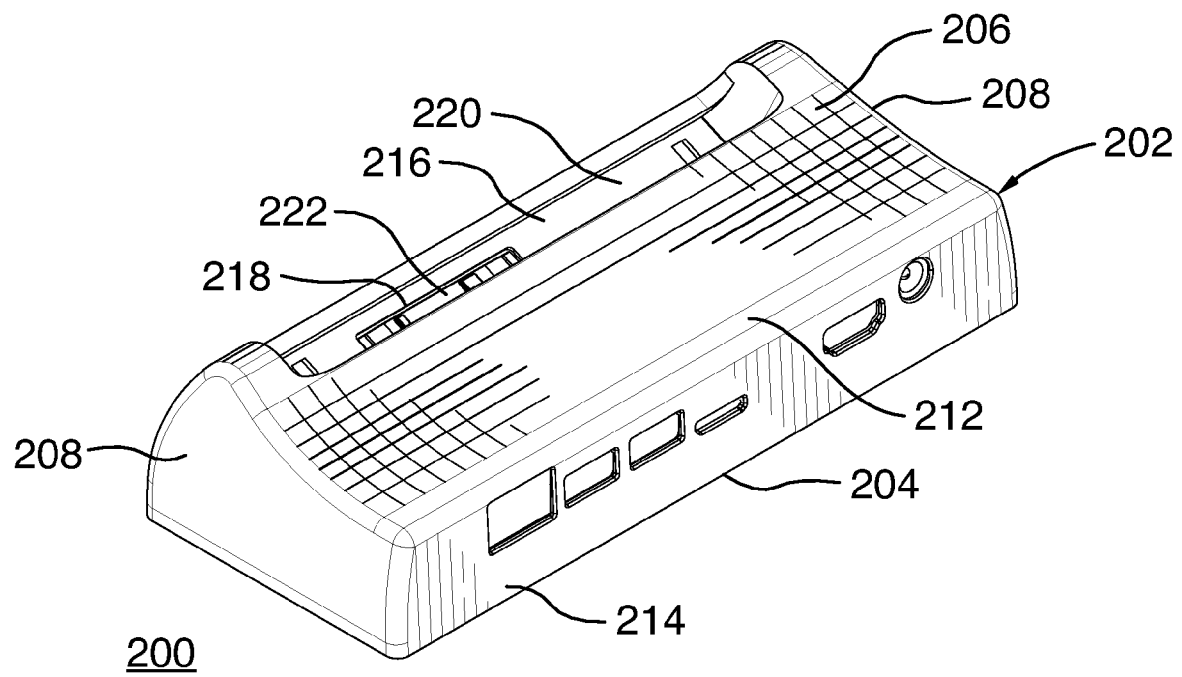

Perspective views of a dock 200 for use with the portable electronic device 100 are shown in FIG. 2A and FIG. 2B. The dock 200 includes a housing 202 for receiving or holding the portable electronic device 100, and components disposed in the housing 202 for electrically and optically communicating with the portable electronic device 100. The housing 202 may be made of any suitable material, such as, for example, injection molded plastic. Other inorganic or organic materials, or combinations of materials, that may offer qualities such as durability, robustness, sturdiness, heat management, aesthetic attractiveness, reasonable weight and the like, may include various metals, plastics, polymers, rubbers, silicones, wood, glass, ceramics, stone, composites and the like.

The housing 202 includes a base 204 that may be disposed on and abut a surface of, for example, a table or desk, when the dock 200 is utilized to receive a portable electronic device 100. The base 204 may include an anti-slip texture or anti-slip material, such that the base 204 is less likely to slip or slide on the surface. Resistance to sliding may be especially helpful when the portable electronic device 100 includes a user-activated structure such as a button, key or touch-sensitive display 118. The housing may also include a cover 206 that includes ends 208 that extend from the base 204. The ends 208 may be substantially identical to one another in shape (in FIGS. 2A and 2B, the faces of the ends 208 are nearly identical but mirror-reversed). In this example, the ends 208 are substantially parallel to one another. In the example illustrated in FIG. 2A and FIG. 2B, the sides that extend between the ends 208 include a front side 210, a top side 212, and a back side 214. The front side 210 and the top side 212 may be curved as illustrated or may be planar. Although the back side 214 is planar in the illustrated example, the back side 214 may also be curved.

The back side 214 of the cover 206 includes ports that may be utilized to transmit power, or data, or both. The ports may be electrically coupled to the main printed circuit board (referred to below) of the dock 200 and may be utilized to couple to a further electronic device for data communication therewith, for coupling to a power source for charging the battery of the portable electronic device 100, or for coupling to a further electronic device to facilitate charging of a battery of the further electronic device.

The cover 206 of the housing 202 includes an elongate recess 216 that extends into the front side 210 and the top side 212 for receiving the portable electronic device 100 and, in which the portable electronic device 100 is supported. The recess 216 is sized and shaped to receive the portable electronic device 100 and facilitates location and engagement of the portable electronic device 100 in the dock 200. The recess 216 includes an elongate aperture 218 disposed in the bottom 220 of the recess 216 for coupling a communication assembly 222 of the dock 200 with complementary elements or features of the portable electronic device 100.

Figure 3A:
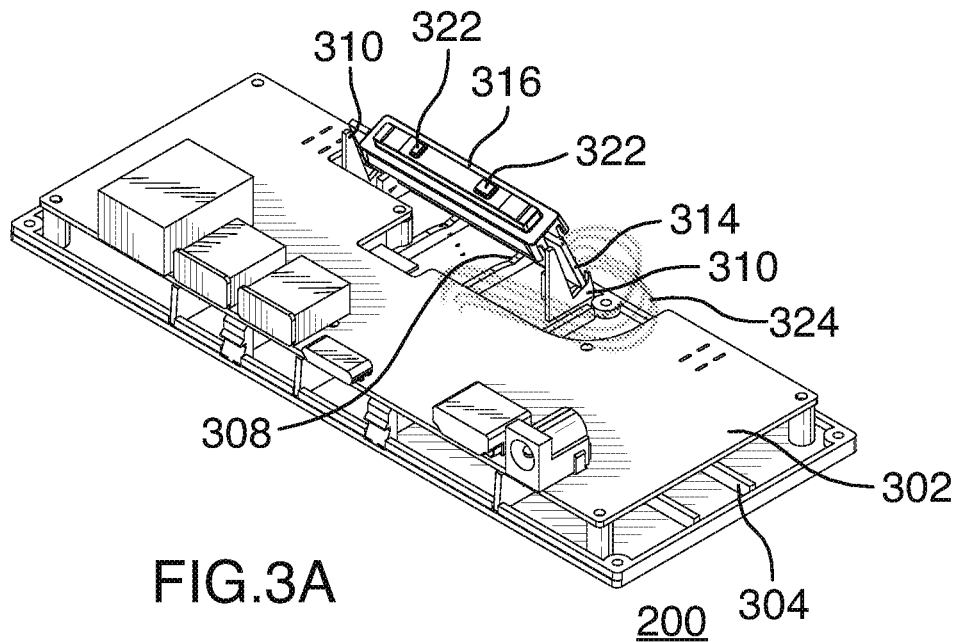
FIG. 3A and FIG. 3B are perspective views of the dock with a housing cover removed.
Figure 3B:
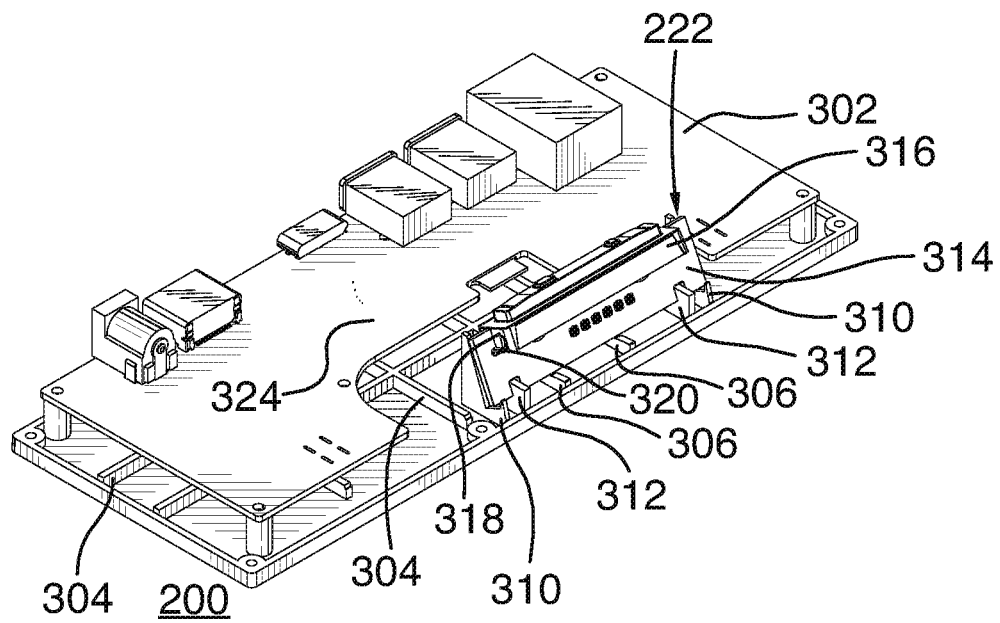

Perspective views of the dock 200 with the cover 206 of the housing 202 removed, are shown in FIG. 3A and FIG. 3B. The communication assembly 222 is shown in FIG. 3A and FIG. 3B. FIG. 3A and FIG. 3B also illustrate a main printed circuit board 302 that is fixed to the base 204 of the housing 202 and spaced therefrom. Various electrical components are coupled to the main printed circuit board 302 of the dock 200. The electrical components may facilitate communication with external interfaces such as HDMI, USB, and other interfaces. The electrical components also include a power receptacle to couple the dock 200 to a power source and various active and passive components to facilitate communication between the optical module and the portable electronic device and to facilitate interaction with external devices, such as computers, networks, TV, speaker system, etc. The example illustrated in the figures is utilized, for example, as a desktop docking device. Alternatively, such docking devices may be hard-wired, for example, to the console of a vehicle. In other examples, such docks may be integrated into devices or appliances, such as a treadmill for audio purposes or to TV, for example.

The housing 202 includes ribs 304 that extend upwardly, or generally perpendicularly, from the base 204 to provide additional strength to the base 204. The ribs 304 are spaced apart on the base 204 and may be unitary with the base 204. For example, the base 204 and ribs 304 may be integrally molded. Two supporting ribs 306 extend under the communication assembly 222 and include grooves or notches 308. The supporting ribs provide a support for the communication assembly 222, for example, when the portable electronic device 100 is not engaged in the dock 200.

A pair of end support members, also referred to as end supports 310 extend upwardly, or generally perpendicularly, from the base 204 and may be integral with the base 204. The end supports 310 are spaced apart to provide a seat for opposite ends of the communication assembly 222 such that the communication assembly 222 may be seated on the end supports 310 and the two supporting ribs 306, on or near the grooves 308 of the supporting ribs. Thus, the supporting ribs 306 and the end supports 310 provide a seat on which the communication assembly 222 may be supported when the portable electronic device 100 is not engaged in the dock 200.

A pair of guides 312 also extend upwardly, or generally perpendicularly, from the base 204 and are fixed relative to the base 204. The guides 312 may be integral with the base 204 and are spaced apart such that a guide 312 is disposed between an end support 310 and a supporting rib 306 on each side of the communication assembly 222. The guides 312 cooperate with the communication assembly 222 to guide movement of the communication assembly 222 within the housing 202.

The communication assembly 222 is generally elongate and extends in the housing 202, along the length of the aperture 218 in the recess 216. The communication assembly includes a communication assembly printed circuit board 314 coupled to functional components of the communication assembly 222, and a communication assembly cover 316 that covers the functional components and extends along the communication assembly printed circuit board 314, adjacent the aperture 218 in the recess 216. The communication assembly cover 316 is fixed to the communication assembly printed circuit board 314 by any suitable mechanical coupling. For example, the communication assembly cover 316 may be coupled to the communication assembly printed circuit board 314 by hooks 318 on each side of the communication assembly cover 316 that snap into complementary recesses 320 near each side of the communication assembly printed circuit board 314.

Two protrusions 322 extend from a top of the communication assembly cover 316, with a respective one of the protrusions on each side of center of the communication assembly cover 316. The protrusions 322 are shaped such that a base of the protrusions 322, nearest the communication assembly printed circuit board 314, is wider than the end of the protrusions 322 or the portion of the protrusions 322 that is spaced from the top of the communication assembly cover 316. The shaped protrusions 322 are utilized to mate with complementary recesses of the portable electronic device 100 when the portable electronic device 100 is received in the dock 200, and to facilitate alignment of one or more optical transceivers of the communication assembly 222 with one or more optical transceivers of the portable electronic device 100. In the example illustrated in FIG. 3A and FIG. 3B, the protrusions are not identical in size and the complementary recesses in the portable electronic device 100 are also not identical in size. One of the protrusions is larger than the other to facilitate alignment of the portable electronic device 100 when the portable electronic device 100 is in the correct orientation in the dock 200 and to inhibit engagement of the portable electronic device 100 in an incorrect orientation (i.e., backwards) in the dock 200. Optionally, each protrusion may have a different shape, or different orientation, or may not be equally spaced from the center of the communication assembly cover 316 to inhibit engagement of the portable electronic device 100 in the incorrect orientation. In this example two protrusions are shown. Alternatively, a non-symmetrical single protrusion, or more than two protrusions may be utilized. Alternatively a symmetrical protrusion along with magnets may inhibit incorrect engagement of the portable electronic device. The communication assembly 222 includes wires 324 that electrically and mechanically connect the communication assembly printed circuit board 314 to the main printed circuit board 302. The wires 324 may be arranged in any suitable manner. For example, the wires 324 may be bundled into a harness, laminated into a flat film. Alternatively, a flexible printed ciruit board may be utilized.

Figure 3C:
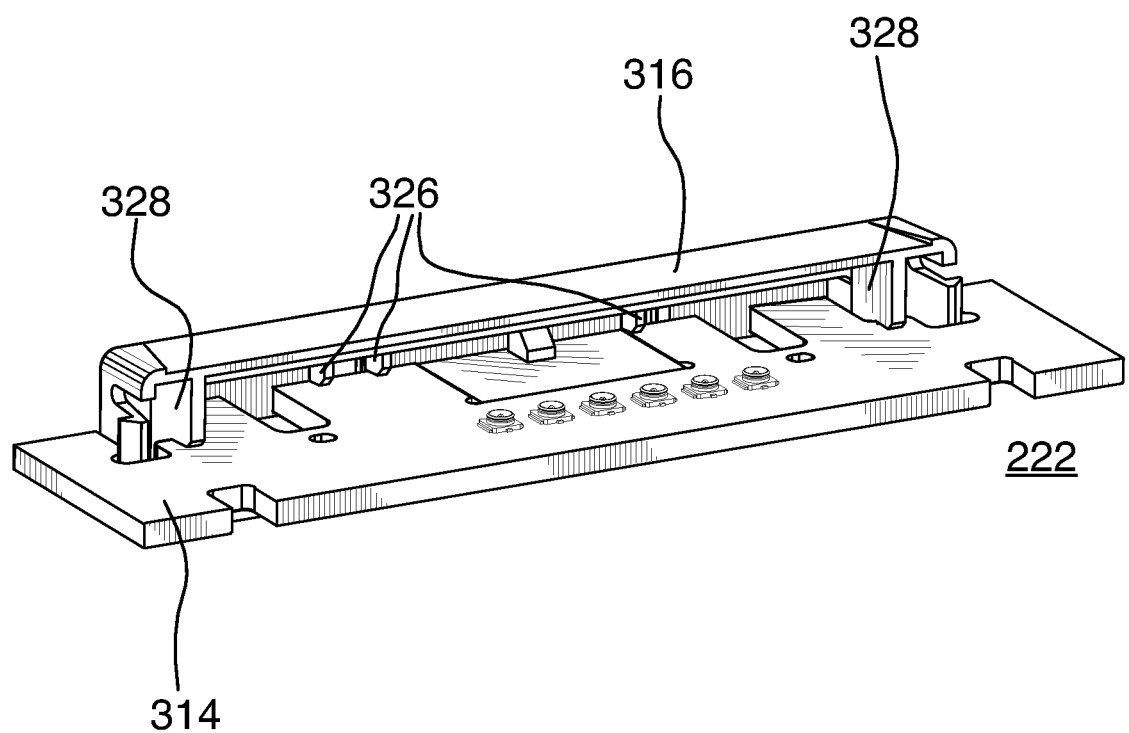
FIG. 3C is a bottom perspective view of a communication assembly of the dock.

A bottom perspective view of the communication assembly 222 is illustrated in FIG. 3C. The communication assembly cover 316 may include ribs adjacent to the communication assembly printed circuit board 314 in a staggered arrangement to hold the communication assembly printed circuit board 314 and to facilitate alignment of the communication assembly printed circuit board 314 such that the communication printed circuit board 314 is generally perpendicular to the external face of the cover, which reduces chances for misalignment. The size and shape of the ribs may vary. In the present example, inner ribs 326 are provided on both sides of the communication assembly cover 316 and larger outer ribs 328 are provided on both sides of the communication assembly cover 316.

Figure 4:
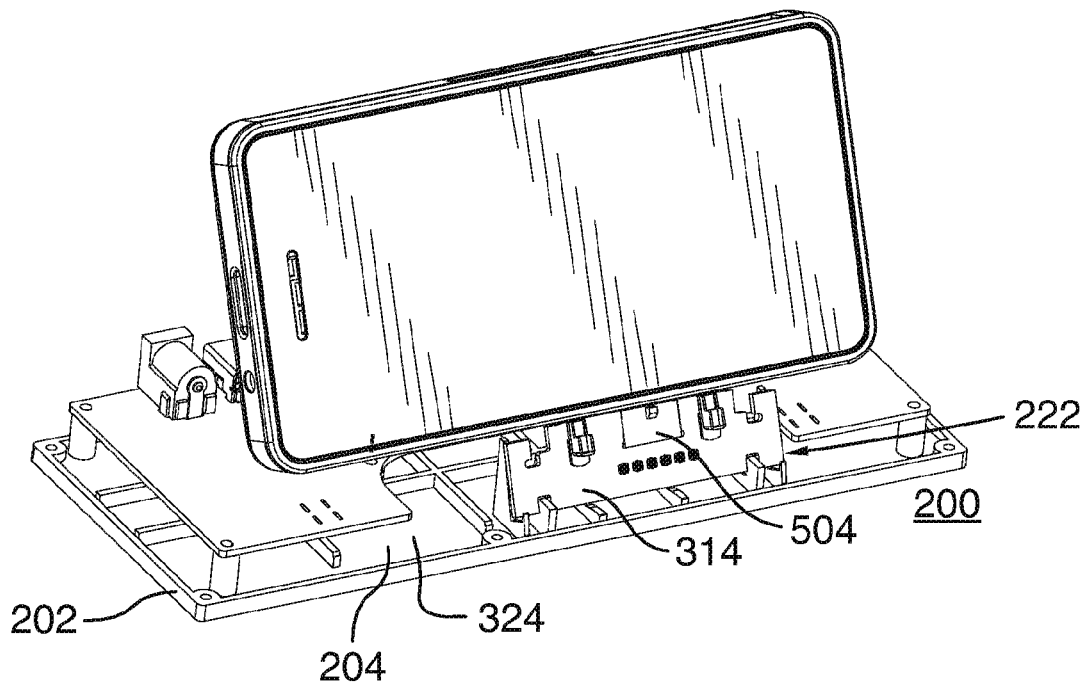
FIG. 4 is a perspective view of the portable electronic device received in the dock, with the cover of the dock and a front of the electronic device removed to illustrate detail.
Figure 5:
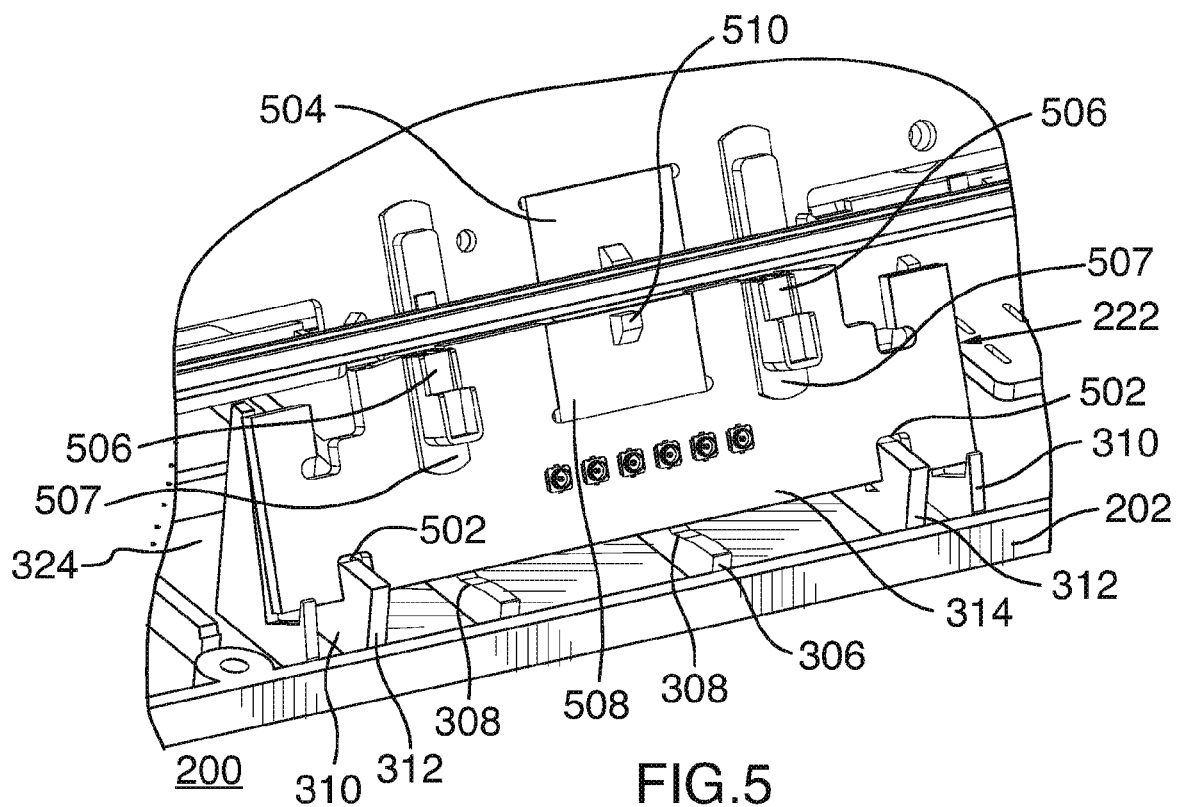
FIG. 5 is a partial perspective view of the portable electronic device received in the dock, as shown in FIG. 4, drawn to a larger scale.

Perspective views of the portable electronic device 100 received in the dock 200 are shown in FIG. 4 and FIG. 5. In these figures, the cover 206 of the dock 200, the communication assembly cover 316, and a front, including the touch-sensitive display 118, of the electronic device 100, are removed to illustrate detail. As indicated, the communication assembly cover 316 is removed to show functional components of the communication assembly 222. Referring to the communication assembly printed circuit board 314, notches 502 are included in the communication assembly printed circuit board 314 and the guides 312 are disposed in, i.e., extend into, the notches 502. The notches 502 are larger than the guides 312 to facilitate movement of the communication assembly printed circuit board 314 relative to the guides 312, thereby facilitating movement of the communication assembly 222 relative to the housing 202 of the dock 200.

The communication assembly 222 also includes an optical module 504 centered along the elongate communication assembly 222 and coupled to the communication assembly printed circuit board 314. As described above, the communication assembly 222 includes wires 324 that electrically and mechanically connect the communication assembly printed circuit board 314 to the main printed circuit board 302. The wires 324 are long and flexible enough to facilitate free movement of the communication module 222 in response to the magnetic attraction of the magnets 506 The magnets 506 are disposed on either side of the optical module 504 such that a respective magnet 506 is disposed on each side of the optical module 504. The magnets 506 are coupled to the communication assembly printed circuit board 314. The magnets may be mounted in any suitable manner. In the present example, the magnets 506 include a cover 507 that may be shaped to facilitate perpendicular alignment of the communication assembly printed circuit board 314. The magnets may alternatively or additional be mounted utilizing an adhesive or adhesives, double-sided pressure sensitive tapes, etc. In this example the cover 507 is stainless steel cover 507 that includes hooks 802 (shown in FIG. 8) to engage and lock on the communication assembly printed circuit board 314. The cover 507 also shields the magnetic field away from the printed circuit board of the portable electronic device 100. Thus, the magnets 506 are coupled to the optical module 504 via the communication assembly printed circuit board 314. The optical module 504 and the magnets 506 are in a fixed position relative to each other, are disposed under the communication assembly cover (not shown in FIG. 4 and FIG. 5), and are located such that the optical module 504 aligns with an optical module of the portable electronic device 100 and the magnets 506 align with complementary magnets of the portable electronic device 100, when the portable electronic device 100 is disposed in the dock 200.

The magnets 506 may be any suitable magnets, such as, for example, bar magnets. Optionally, the magnets 506 may each be of different polarity such that a first one of the magnets 506 is oriented with the north pole located near the communication assembly cover 316 and a second one of the magnets 506 is oriented with the south pole located near the communication assembly cover 316. The complementary magnets of the portable electronic device 100 are of opposite polarity to facilitate engagement of the portable electronic device 100 in the correct orientation in the dock 200. Thus, the magnets 506 in the dock 200 repel the magnets in the portable electronic device 100 when the portable electronic device 100 is placed backwards in the dock 200. Use of two magnets 506 of opposite polarity near the communication assembly cover 316 inhibits engagement of the portable electronic device 100 in an incorrect orientation (i.e., backwards) in the dock 200. Optionally, the protrusions 322 may be of the same size and shape when two magnets of opposite polarity are utilized in the dock 200, and engagement of the portable electronic device 100 in the incorrect orientation is still inhibited. In another arrangements, the magnets may be only on the dock 200 or only on the portable electronic device 100 and the other device may have ferrous plates or blocks to facilitate coupling. Alternatively, the dock 200 may have one magnet and one ferrous piece or plate and the portable electronic device 100 may have a ferrous piece or plate corresponding to the magnet on the dock 200, and a magnet corresponding to the ferrous piece or plate on the dock 200. The magnet polarity facing the outside of the dock 200 and portable electronic device 100 may be the same, such that the magnets repel each other if the portable electronic device 100 is incorrectly engaged.

The optical module 504 includes an optical printed circuit board 508 and one or more optical transceivers 510 for communication with one or more optical transceiver(s) of the portable electronic device 100. The optical transceiver 510 of the optical module 504, referred to throughout the description may include one or more optical transceivers. The optical transceiver of the portable electronic device 100 may also include one or more optical transceivers. The communication assembly cover 316 is transparent to the light beams emitted by the transceiver to facilitate optical communication between the optical transceiver(s) 510 and the optical transceiver of the portable electronic device 100. The optical modules may communicate with light waves within the infra-red spectrum and the assembly cover 316 or a lens may be tinted to block all other wavelength light emissions from other sources such as visible light or UV light for example. The portable electronic device 100 may also include a cover or lens with the same optical transparency characteristics to cover the module. The pigment color of the lens may vary according to the light wavelength utilized for the communications and the cosmetic requirements of the devices.

The optical printed circuit board 508 is mechanically and electrically coupled to the assembly printed circuit board 314, providing electrical communication therewith. The assembly printed circuit board 314 is electrically coupled to the main printed circuit board 302 by flex connector or flexible coupling to facilitate movement of the communication assembly 222 relative to the housing 202. The optical printed circuit board provides a mount for the optical transceiver 510 and the related components. Alternatively, the optical transceiver 510 and the related components may be mounted on the assembly printed circuit board 314.

The term electrical communication refers to the ability to send and receive signals electrically, as opposed to optically or audibly, for example.

When a portable electronic device 100 is not disposed in the dock 200, the communication assembly 222 is seated in the housing 202 such that the assembly printed circuit board 314 is seated on the end support members or end supports 310, and on the grooves 308 of the two supporting ribs 306. The communication assembly 222 is moveable away from the end supports 310 and the supporting ribs 306 such that the communication assembly 222 is moveable away from the base 204. The communication assembly 222 is also moveable back toward the base 204 until the communication assembly 222 is seated on the end supports 310 and the supporting ribs 306.

The communication assembly 222 is also moveable relative to the housing 202 such that the communication assembly 222 is moveable toward the front side 210 (shown in FIG. 2A and FIG. 2B) and toward the back side 214 (shown in FIG. 2A and FIG. 2B) of the housing 202. The relative movement of the communication assembly 222 facilitates angular movement of the communication assembly 222 relative to the aperture 218 (shown in FIG. 2A and FIG. 2B) in the recess 216 (shown in FIG. 2A and FIG. 2B). Thus, the angle of the assembly printed circuit board 314 relative to the base 204 may vary. The communication assembly 222 is also moveable from side to side such that the communication assembly 222 is moveable toward and away from each end 208 (shown in FIG. 2A and FIG. 2B).

Figure 6:
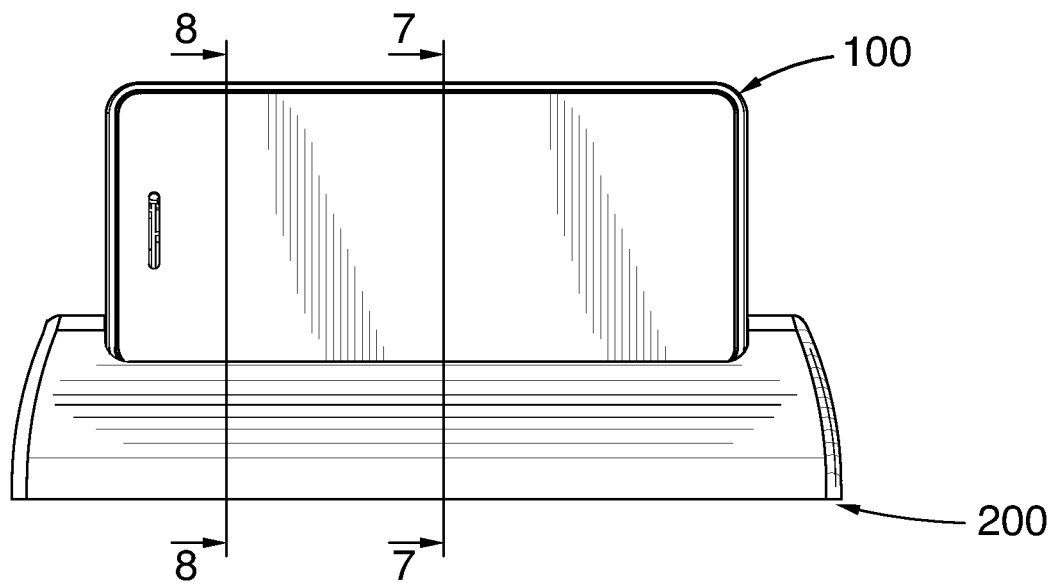
FIG. 6 is a front view of the portable electronic device received in the dock.
Figure 7:
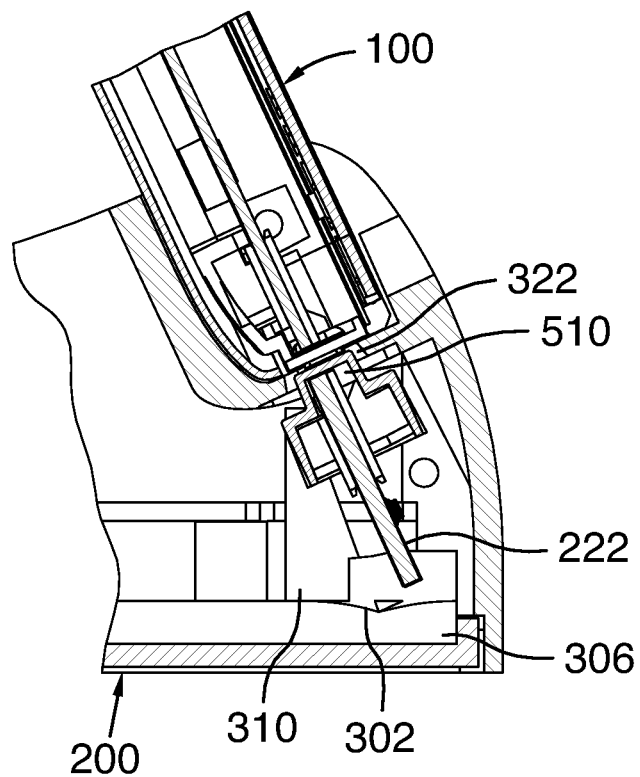
FIG. 7 is a sectional view through the line 7-7 of FIG. 6, drawn to a larger scale.
Figure 8:
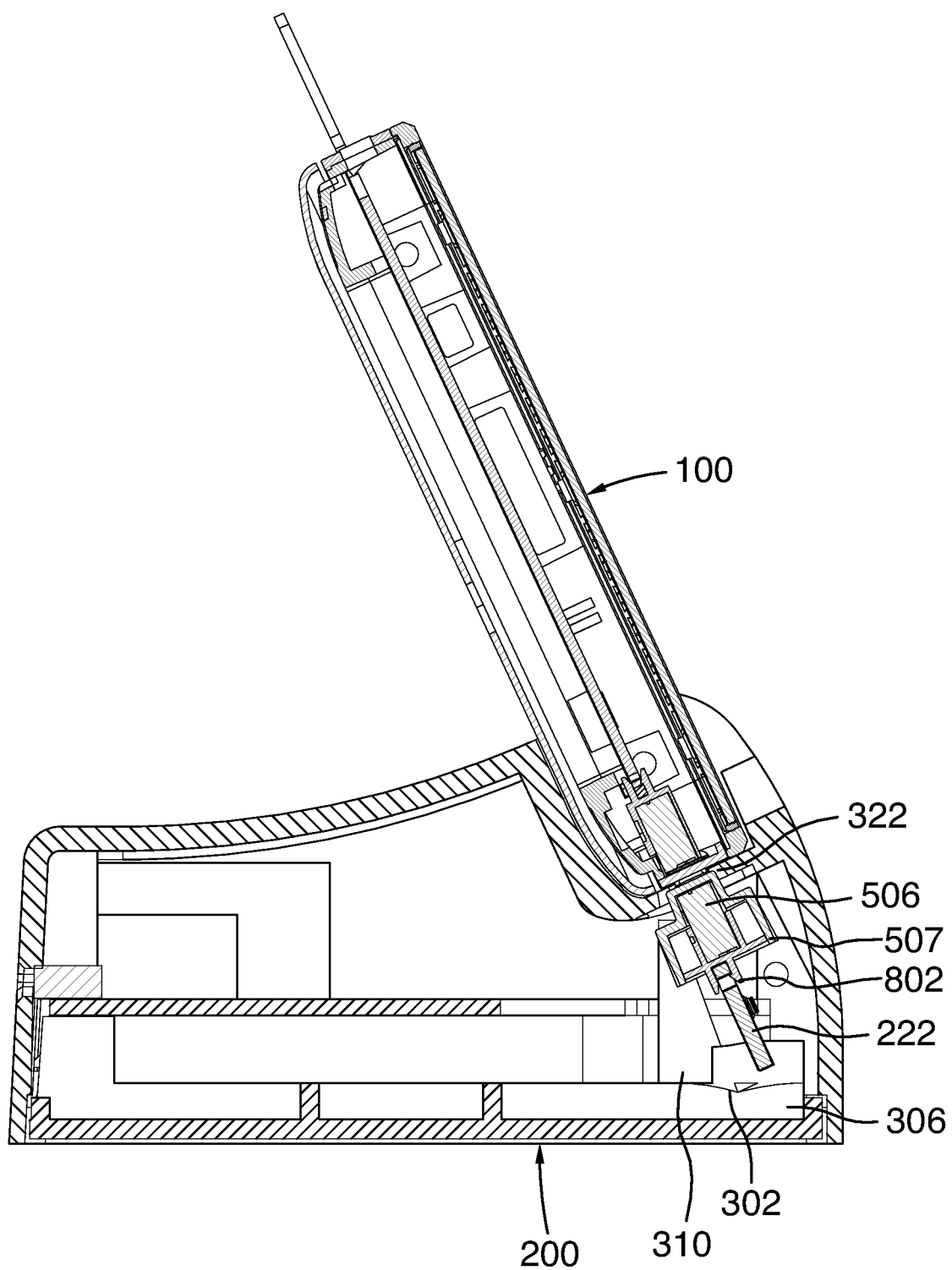
FIG. 8 is a sectional view through the line 8-8 of FIG. 6, drawn to a larger scale.

FIG. 6, FIG. 7, and FIG. 8 illustrate the portable electronic device 100 received in the dock 200. When the portable electronic device 100 is received in the dock 200, the communication assembly 222 moves due to attractive magnetic forces between magnets of the portable electronic device 100 and the magnets 506 of the communication assembly 222. The communication assembly 222 is lifted off the end supports 310 and the grooves 308 of the two supporting ribs 306.

Referring to FIG. 7 and FIG. 8, the optical transceiver 510 is fixed in the communication assembly 222, relative to the magnets 506 and relative to the protrusions 322. When the magnets 506 are engaged with complementary magnets of the portable electronic device 100, the optical transceiver 510 is aligned with the optical transceiver of the portable electronic device 100. The shaped protrusions 322 (not shown) are disposed on opposite sides of the optical transceiver 510 and mate with complementary recesses of the portable electronic device 100 to facilitate and enhance alignment of the optical transceiver 510 of the communication assembly 222 with the optical transceiver of the portable electronic device 100.

Small movements of the portable electronic device 100 within the dock 200, cause movement of the magnets of the portable electronic device 100 and the optical transceiver of the portable electronic device 100. The attractive magnetic forces and the protrusions 322 in complementary recesses of the portable electronic device 100, cause the portable electronic device 100 to remain engaged in the dock 200 and the optical transceiver 510 of the communication assembly 222 to remain aligned with the optical transceiver of the portable electronic device 100. This particularly helps reduce the chance of lost connectivity due to vibration or impacts during normal use.

The magnets 506 of the communication assembly 222 cooperate with the complementary magnets disposed in the portable electronic device 100 and releasably engage or connect, i.e., fasten, but not necessarily permanently or tightly, typically without any need for tools, the portable electronic device 100 in the dock 200. Thus, the portable electronic device 100 may be disengaged from the dock by application of a force lifting the portable electronic device 100 with sufficient force to overcome the magnetic forces.

The movements described herein are slight or relatively small but such movement facilitates alignment of the optical transceiver 510 with the optical transceiver of the portable electronic device 100. Further, the communication assembly 222 is moveable along with slight movements of the portable electronic device 100 such that the optical transceiver 510 may remain aligned and in communication with the optical transceiver of the portable electronic device 100 when the portable electronic device 100 is moved slightly in the dock 100. The terms in communication with are utilized herein to refer to the ability of elements to send and/or receive signals.

Although not described, the dock 200 may also include the electrical components for transmission power to enable charging of the battery of the portable electronic device 100. In one example, the dock 200 includes an inductive coil disposed in the housing 202 to cooperate with an inductive coil disposed in the portable electronic device 100 for charging the battery of the portable electronic device 100.

Utilizing the dock 200, optical coupling to the portable electronic device 100 is facilitated. The communication assembly 222 is moveable along with slight movements of the portable electronic device 100 such that the optical transceivers may remain aligned and in communication when the portable electronic device 100 is moved slightly in the dock 100. Further, the optical transceiver and components of the portable electronic device 100 that are utilized for coupling may be fixed in the portable electronic device 100 to facilitate sealing of the portable electronic device 100 from, for example, contaminants. Slight movements of the portable electronic device 100 are compensated for by the movement of the communication assembly 222 of the dock 200.

The embodiments described above may also be described in more general terms. For example, various components may be described in terms of means for performing a specified function.

Advantageously, the dock is arranged and constructed to quickly and easily receive a portable electronic device. The portable electronic device may be easily engaged by placing the portable electronic device in the dock. The portable electronic device may be disengaged from the dock by application of sufficient force to overcome magnetic forces, without requiring the use of tools. The portable electronic device may move slightly or by a relatively small amount within the dock but still maintain alignment of the optical transceiver with the optical transceiver of the portable electronic device to facilitate communication. The ability to maintain alignment of the optical transceivers facilitates use of such a dock in locations in which the dock may be moved slightly or vibrated, such as in a car, on a treadmill, or in other environments where the portable electronic device or the dock may slightly move. The disclosed device may be utilized with a variety of optical connectors as well as with non-optical connectors and connectors having optical and non-optical elements. The described apparatus may take up little space and add little weight while providing reliable connectivity.

The described embodiments are to be considered in all respects only as illustrative and not restrictive. The scope of the claims should not be limited by the preferred embodiments set forth in the examples, but should be given the broadest interpretation consistent with the description as a whole. Many variations may be within the scope of the claims, such as stands that do not include exactly six sides, embodiments that include no moving parts and embodiments that include no electrical components.

What is claimed is:

1. A dock for receiving a portable electronic device, comprising:
   a housing comprising:

a base and a cover having an aperture in a recess thereof, and supports extending from the base of the housing, the housing for receiving and supporting the portable electronic device; and a communication assembly disposed in the housing and moveable relative to the housing, the communication assembly comprising:

an optical printed circuit board;

a dock optical transceiver coupled to the optical printed circuit board and disposed in the aperture for aligning with a device optical transceiver when the portable electronic device is disposed in the recess;

at least one dock magnet coupled to the optical transceiver for aligning with at least one electronic device magnet of the portable electronic device to facilitate engagement and disengagement of the portable electronic device with the dock and to facilitate alignment of the dock optical transceiver with the device optical transceiver when the portable electronic device is engaged with the dock;

wherein the communication assembly is seated on the supports that extend from the base when the portable electronic device is not engaged with the dock and the communication assembly is lifted off of the supports due to magnetic attraction between the at least one dock magnet and the at least one electronic device magnet when the portable electronic device is engaged with the dock.

2. The dock according to claim 1, wherein the communication assembly comprises an assembly printed circuit board disposed in the housing and extending adjacent the recess, the assembly printed circuit board in electrical communication with the optical printed circuit board.

3. The dock according to claim 1, comprising guides disposed in and fixed relative to the housing to guide movement of the communication assembly.

4. The dock according to claim 1, wherein the supports comprise ribs extending from a base of the housing to guide movement of the communication assembly.

5. The dock according to claim 1, wherein the supports comprise support members extending from the base of the housing to provide a seat for ends of the optical printed circuit board to support the communication assembly when the portable electronic device is not engaged in the dock.

6. The dock according to claim 2, comprising a main printed circuit board fixed in the housing and coupled to the assembly printed circuit board by a flexible connection to facilitate movement of the communication assembly within the housing.

7. The dock according to claim 2, comprising a cover coupled to the assembly printed circuit board and extending over the dock optical transceiver and the at least one dock magnet.

8. The dock according to claim 5, wherein the support members are spaced apart such that at support members are disposed on opposite sides of a center of the communication assembly.

9. The dock according to claim 4, wherein the ribs are spaced apart such that ribs are disposed on opposite sides of a center of the communication assembly.

10. The dock according to claim 7, wherein the cover includes protrusions for mating with recesses of the portable electronic device to facilitate alignment of the dock optical transceiver with the device optical transceiver.

11. The dock according to claim 7, wherein the at least one dock magnet comprises at least two dock magnets in opposite orientations such that a first dock magnet is oriented with a north pole located near a cover of the communication assembly cover and a second dock magnet is oriented with a south pole located near cover of the communication assembly.

12. The dock according to claim 7, wherein the at least one dock magnet comprises a cover that is shaped to facilitate perpendicular alignment of the assembly printed circuit board.

13. The dock according to claim 10, wherein the protrusions are wider at a base than at an end.

14. The dock according to claim 10, wherein the protrusions are spaced apart such that protrusions are disposed on opposite sides of the dock optical transceiver.

15. The dock according to claim 14, wherein the protrusions differ from each other in at least one of size, shape, and orientation.

* * * * *